April 14, 1959     A. L. CARTER     2,882,362
TIRE DEFLATION SIGNAL
Filed April 23, 1957
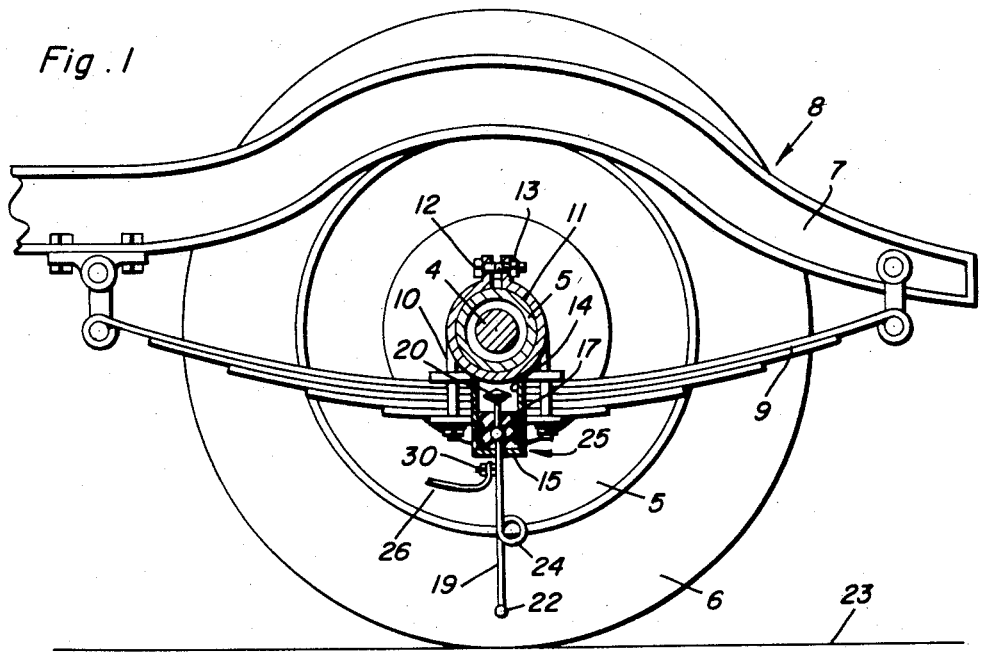
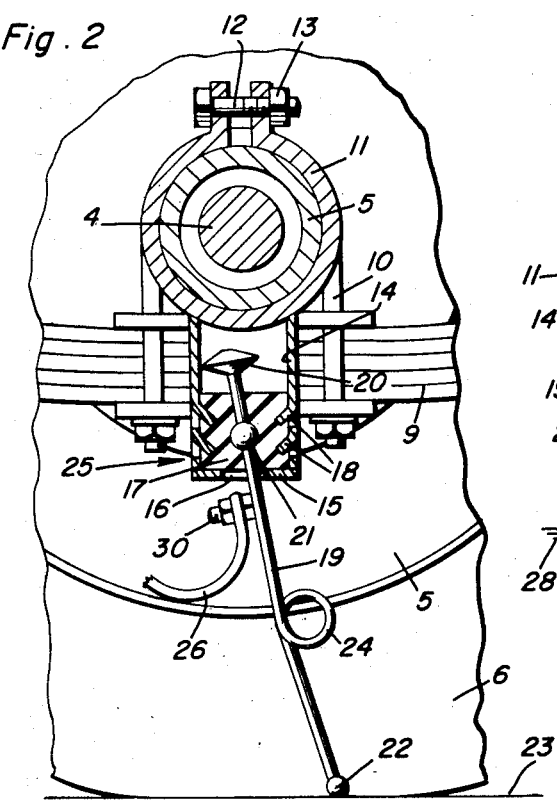
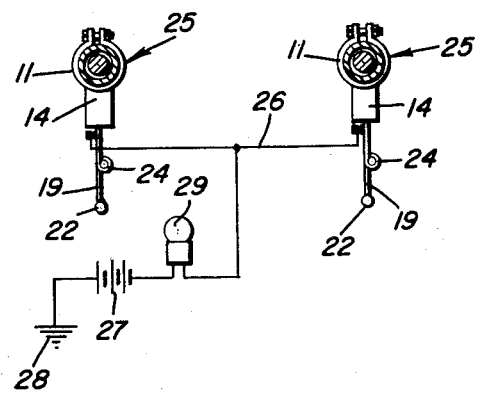
Alton L. Carter
INVENTOR.

United States Patent Office 2,882,362
Patented Apr. 14, 1959

2,882,362

TIRE DEFLATION SIGNAL

Alton L. Carter, Corpus Christi, Tex.

Application April 23, 1957, Serial No. 654,577

1 Claim. (Cl. 200—61.24)

The present invention relates to new and useful improvements in alarms for pneumatic tire equipped vehicles, particularly automobiles, trucks, trailers, etc., and has for its primary object to provide, in a manner as hereinafter set forth, means for automatically energizing an electric signal for warning the operator should any of the tires of the vehicle become under inflated.

Another very important object of the invention is to provide novel means for expeditiously mounting one of the switch units on the vehicle adjacent each of the pneumatic tires thereof.

Other objects of the invention are to provide a tire deflation signal of the aforementioned character which will be comparatively simple in construction, strong, durable, reliable in operation and which may be manufactured and installed at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in vertical section through an embodiment of the invention, showing the device installed beneath the rear end of a motor vehicle;

Figure 2 is an enlarged view in vertical section substantially similar to Figure 1 but showing the switch in closed position; and Figure 3 is a diagrammatic view.

Referring now to the drawing in detail, it will be seen that reference character 4 designates one of the usual rear axles of a motor vehicle, which axle is enclosed in a housing 5. Fixed on the axle 4 is a conventional wheel 3 having mounted thereon a pneumatic tire 6. The frame 7 of the vehicle 8 is mounted on the housing 5 through the medium of a leaf spring 9 which, in turn, is secured by means comprising U-bolts 10 beneath said housing.

The embodiment of the invention which has been illustrated comprises a clamp 11 of suitable metal in the form of a split sleeve which is tightened on the housing 5 by a bolt 12 having threaded thereon a nut 13.

Fixed beneath the clamp 11 and depending therefrom is a cylinder 14 of suitable metal. In the embodiment shown, the cylinder 14 includes a bottom 15 having formed therein a central opening 16. Fixed in the lower portion of the cylinder 14 is an insulator 17 of resilient rubber or other suitable material. Inwardly struck prongs 18 in the lower portion of the cylinder 14 are embedded in the insulator 17 for anchoring same in position in said cylinder.

Molded in the insulator 17 and extending vertically therethrough is a feeler 19 of suitable resilient metal. The feeler 19 is operable in the opening 16 and extends upwardly through the insulator 17 into the upper portion of the cylinder 14. Fixed on the upper end portion of the feeler 19 is a circular contact 20 for engagement with the cylinder 14. A stop 21 is provided on the feeler 19 in the insulator 17 for preventing said feeler from sliding vertically in said insulator. The major portion of the feeler 19 extends downwardly from the cylinder 14 and terminates at its lower end in a ball 22 for engagement with the surface of the highway, as indicated at 23. At an intermediate point, the feeler 19 is formed to provide a coil 24 for added resiliency.

The elements 14–22, inclusive, and 24 constitute a switch unit which is designated generally by reference character 25. One of the switch units 25 may be installed adjacent each of the wheels of the vehicle. As shown to advantage in Figure 3 of the drawing, conductor wires 26 electrically connect the feelers 19 to the usual storage battery 27 of the vehicle. The negative side of the battery 27 is grounded on the vehicle, as indicated at 28. Interposed in the circuit between the battery 27 and the feelers 19 is an electric signal lamp 29 which is preferably located on the instrument panel of the vehicle. Any other suitable type of electric signal may be used.

It is thought that the operation of the device will be readily apparent from a consideration of the foregoing. Briefly, when the tire 6 is properly inflated the feeler 19 is spaced from the highway 23 and yieldingly held in inoperative position with the element 20 out of engagement with the cylinder 14, as seen in Figure 1 of the drawing. However, should the pneumatic tire 6 become deflated or substantially so the feeler 19 is lowered into engagement with the highway 23 in an obvious manner and forward or rearward movement of the vehicle swings the feeler 19 in its resilient mounting 17 for engaging the contact 23 with the cylinder 14 as shown in Figure 2 of the drawing, thus closing the electric circuit and energizing the signal 29. When the tire is replaced or repaired and again inflated the feeler 19 returns to its neutral or inoperative position by the resilient mounting 17 with the assistance of gravity. The conductor wires 26 may be electrically connected to the feelers 19 in any suitable manner, as indicated at 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A tire deflation responsive switch for closing a signal circuit comprising an upright split clamping sleeve for attachment to an automobile axle, an open top metallic cylinder depending from the bottom of said sleeve and having its top fixed to and closed by said bottom of said sleeve and being provided with a reduced bottom opening, a resilient insulator fixed in the lower part of said cylinder, a metallic feeler fixed vertically in the insulator and depending therefrom through said reduced opening for engagement with the ground and tilting in said insulator, an enlarged circular contact on the upper end of said feeler for engagement with said cylinder, and prongs on said cylinder struck inwardly therefrom for anchoring the insulator in the cylinder.

References Cited in the file of this patent

UNITED STATES PATENTS

| | | |
|---|---|---|
| 2,258,334 | Miller | Oct. 7, 1941 |
| 2,640,119 | Bradford | May 26, 1953 |
| 2,740,007 | Amelang | Mar. 27, 1956 |
| 2,741,673 | Metcalf | Apr. 10, 1956 |